United States Patent
Nair et al.

(10) Patent No.: US 11,757,982 B2
(45) Date of Patent: Sep. 12, 2023

(54) PERFORMING LOAD BALANCING SELF ADJUSTMENT WITHIN AN APPLICATION ENVIRONMENT

(71) Applicant: Avesha, Inc., Bedford, MA (US)

(72) Inventors: Raj Nair, Lexington, MA (US); Prabhudev Navali, Westford, MA (US); Sudhir Halbhavi, Bangalore (IN); Chin-Cheng Wu, Carlisle, MA (US)

(73) Assignee: Avesha, Inc., Chelmsford, MA (US)

( * ) Notice: Subject to any disclaimer, the term of this patent is extended or adjusted under 35 U.S.C. 154(b) by 0 days.

(21) Appl. No.: 17/393,960

(22) Filed: Aug. 4, 2021

(65) Prior Publication Data

US 2022/0046083 A1    Feb. 10, 2022

Related U.S. Application Data

(60) Provisional application No. 63/061,364, filed on Aug. 5, 2020, provisional application No. 63/183,244, filed on May 3, 2021.

(51) Int. Cl.
*H04L 67/1001* (2022.01)
*G06N 20/00* (2019.01)
(Continued)

(52) U.S. Cl.
CPC ......... *H04L 67/1001* (2022.05); *G06N 20/00* (2019.01); *H04L 41/0816* (2013.01);
(Continued)

(58) Field of Classification Search
CPC . H04L 67/1001; H04L 41/0816; H04L 47/20; H04L 67/02; H04L 67/60;
(Continued)

(56) References Cited

U.S. PATENT DOCUMENTS 9,003,432 B1 * 4/2015 Pellowski ........... G06F 11/3485
719/321
2017/0099346 A1    4/2017 Eisenbud et al.
(Continued)

FOREIGN PATENT DOCUMENTS

| EP | 2904491 B1 | 9/2017 |
| EP | 3792760 A1 | 3/2021 |
| WO | 20200252390 | 12/2020 |

OTHER PUBLICATIONS

Chang, Yi, et al.; "Dynamic Weight Based Load Balancing for Microservice Cluster", Computer Science and Application Engineering, Oct. 22, 2018, pp. 1-7.
(Continued)

*Primary Examiner* — Andrew C Georgandellis
(74) *Attorney, Agent, or Firm* — BainwoodHuang

(57) ABSTRACT

A technique performs load balancing self-adjustment within an application environment. The technique involves, while nodes of the application environment load balance traffic among clusters that provide services for an application in accordance with a first load balancing configuration, sensing application environment metrics. The technique further involves performing a self-adjustment operation that generates a second load balancing configuration based on the application environment metrics, the second load balancing configuration being different from the first load balancing configuration. The technique further involves deploying the second load balancing configuration among the nodes to enable the nodes to load balance the traffic among the clusters that provide the services for the application in accordance with second load balancing configuration in place of the first load balancing configuration.

17 Claims, 10 Drawing Sheets

(51) Int. Cl.
| | |
|---|---|
| *H04L 41/0816* | (2022.01) |
| *H04L 67/60* | (2022.01) |
| *H04L 67/02* | (2022.01) |
| *H04L 47/20* | (2022.01) |
| *H04N 21/2187* | (2011.01) |
| *H04N 21/422* | (2011.01) |
| *H04N 21/431* | (2011.01) |
| *H04N 21/433* | (2011.01) |
| *H04N 21/466* | (2011.01) |
| *H04N 21/472* | (2011.01) |

(52) U.S. Cl.
CPC ............... *H04L 47/20* (2013.01); *H04L 67/02* (2013.01); *H04L 67/60* (2022.05); *H04N 21/2187* (2013.01); *H04N 21/42203* (2013.01); *H04N 21/4312* (2013.01); *H04N 21/4334* (2013.01); *H04N 21/466* (2013.01); *H04N 21/47217* (2013.01)

(58) Field of Classification Search
CPC ............... H04L 67/101; H04L 67/1023; H04L 67/1029; H04L 67/1008; H04L 67/34; G06N 20/00; G06N 3/08; G06N 20/20; H04N 21/2187; H04N 21/42203; H04N 21/4312; H04N 21/4334; H04N 21/466; H04N 21/47217; G08B 13/19671; G06F 9/5077
See application file for complete search history.

(56) References Cited

U.S. PATENT DOCUMENTS

| | | | |
|---|---|---|---|
| 2018/0331969 | A1 | 11/2018 | Chen et al. |
| 2020/0287962 | A1* | 9/2020 | Mishra ................... H04L 43/065 |
| 2020/0314173 | A1* | 10/2020 | Pahwa ..................... H04L 67/10 |
| 2020/0336369 | A1* | 10/2020 | Ratnasamy ............. H04L 41/40 |
| 2021/0014141 | A1* | 1/2021 | Patil ........................ H04W 24/02 |
| 2021/0099829 | A1* | 4/2021 | Soto ..................... H04N 21/4122 |
| 2021/0211371 | A1* | 7/2021 | Ceccarelli ............. H04L 45/123 |

OTHER PUBLICATIONS

Niu Yipei, et al.; "Load Balancing Across Microservices", IEEE Infocom 2018—IEEE Conference on Computer Communications, Apr. 16, 2018, pp. 198-206.
Samreen Faiza; "Q-Learning Scheduler and Load Balancer for Heterogeneous Systems", Journal of Applied Sciences, Jan. 1, 2007, pp. 1504-1510.
International Search Report and the Written Opinion from International Searching Authority (US) for International Application No. PCT/US2021/044503, dated Nov. 18, 2021, 15 pages.
Nicolas, et al.; "Proactive Autoscaling for Cloud-Native Applications Using Machine-Learning", Globecom 2020—2020 IEEE Global Communications Conference, IEEE, Dec. 7, 2020, pp. 1-7.
Anonymous: "Horizontal Pod Autoscaler Kubernetes", May 1, 2021, pp. 1-8.
Anonymous: "Kubernetes Autoscaling in Production: Best Practices for Cluster Autoscaler, HPA and VPA", Apr. 13, 2021, pp. 1-17.
Anonymous: "Dynamic Network Slicing: Challengesand Opportunities Springerlink", May 29, 2020, pp. 1-41.

* cited by examiner ize this application or to address a degraded microservices application, the operator typically provisions the microservices application with more resources (e.g., by adding more network resources, more CPU power, more memory, etc.). Due to the number of microservices, connections, servers, etc. in play, it is impractical for the operator to attempt to manually modify any load balancing operation (e.g., change from one load balancing approach to another) in hope of seeing a significant performance improvement.

PERFORMING LOAD BALANCING SELF ADJUSTMENT WITHIN AN APPLICATION ENVIRONMENT

CROSS REFERENCE TO RELATED APPLICATIONS

This application is a regular utility application based on earlier-filed U.S. Application No. 63/061,364 filed on Aug. 5, 2020, entitled "Real Time Edge Inference Platform", the contents and teachings of which are hereby incorporated by reference in their entirety.

Additionally, this application claims priority to and the benefit of earlier-filed U.S. Application No. 63/183,244 filed on May 3, 2021, entitled "Smart Application Framework", the contents and teachings of which are hereby incorporated by reference in their entirety.

BACKGROUND

A monolithic application may consist of a few tightly coupled application components generated from a large code base. Such components may include a client-side component (e.g., a GUI, browser code, etc.), a server-side component (e.g., data processing logic, a webserver, etc.), one or more databases, and so on.

In contrast to a monolithic application, an application that uses a microservices architecture is typically constructed from a collection of small independent microservice units. Such microservice units have their own coding/logic, databases, etc., and are able to provide independent (or loosely coupled) microservices.

SUMMARY

For an application that uses a microservices architecture, requests for a particular microservice may be load balanced among microservice units (i.e., upstream hosts) that provide the particular microservice. For example, such requests may be load balanced using a round robin approach in which the requests are distributed among the upstream hosts in round robin order. As another example, such requests may be load balanced using a weighted round robin approach in which the requests are distributed among the upstream hosts in accordance with preset weights. Other approaches include sending the requests to the upstream hosts randomly, sending the requests to the least loaded upstream host, and sending the requests to the upstream host with the least traffic.

In order to scale a microservices application or to address a degraded microservices application, the operator typically provisions the microservices application with more resources (e.g., by adding more network resources, more CPU power, more memory, etc.). Due to the number of microservices, connections, servers, etc. in play, it is impractical for the operator to attempt to manually modify any load balancing operation (e.g., change from one load balancing approach to another) in hope of seeing a significant performance improvement.

In contrast to the above-described approach of improving performance of a microservices application by adding resources, improved techniques involve providing load balancing self-adjustment within an application environment. That is, while nodes of the application environment load balance traffic among clusters that provide services for an application in accordance with an existing load balancing configuration, certain application environment metrics are sensed and used to electronically determine a new load balancing configuration to replace the existing load balancing configuration. For example, data from such metrics may be input into a policy engine that applies analytics to smartly generate the new load balancing configuration (e.g., different load balancing weights). The new load balancing configuration is then deployed among the nodes to replace the existing load balancing configuration. With the new load balancing configuration, the application environment is able to provide more efficient and effective performance (e.g., improved traffic flow, lower latency, higher throughput, optimized connections, better balanced server loads, combinations thereof, etc.). As a result, such techniques are able to improve application performance without requiring an operator to provision the application environment with additional resources.

One embodiment is directed to a method of performing load balancing self-adjustment within an application environment. The method includes, while nodes of the application environment load balance traffic among clusters that provide services for an application in accordance with a first load balancing configuration, sensing application environment metrics. The method further includes performing a self-adjustment operation that generates a second load balancing configuration based on the application environment metrics, the second load balancing configuration being different from the first load balancing configuration. The method further includes deploying the second load balancing configuration among the nodes to enable the nodes to load balance the traffic among the clusters that provide the services for the application in accordance with second load balancing configuration in place of the first load balancing configuration.

Another embodiment is directed to electronic circuitry which includes memory and control circuitry coupled to the memory. The memory stores instructions which, when carried out by the control circuitry, cause the control circuitry to perform a method of:

(A) while nodes of an application environment load balance traffic among clusters that provide services for an application in accordance with a first load balancing configuration, sensing application environment metrics, (B) performing a self-adjustment operation that generates a second load balancing configuration based on the application environment metrics, the second load balancing configuration being different from the first load balancing configuration, and (C) deploying the second load balancing configuration among the nodes to enable the nodes to load balance the traffic among the clusters that provide the services for the application in accordance with second load balancing configuration in place of the first load balancing configuration.

Yet another embodiment is directed to a computer program product having a non-transitory computer readable medium which stores a set of instructions to perform load balancing self-adjustment within an application environment. The set of instructions, when carried out by computerized circuitry, causes the computerized circuitry to perform a method of:

(A) while nodes of the application environment load balance traffic among clusters that provide services for an application in accordance with a first load balancing configuration, sensing application environment metrics;

(B) performing a self-adjustment operation that generates a second load balancing configuration based on the application environment metrics, the second load balancing configuration being different from the first load balancing configuration; and (C) deploying the second load balancing configuration among the nodes to enable the nodes to load balance the traffic among the clusters that provide the services for the application in accordance with second load balancing configuration in place of the first load balancing configuration.

In some arrangements, the first load balancing configuration includes a first set of load balancing weights. Additionally, sensing the application environment metrics includes obtaining the application environment metrics while the nodes of the application environment load balance the traffic among the clusters that provide the services in accordance with the first set of load balancing weights.

In some arrangements, the second load balancing configuration includes a second set of load balancing weights. At least some of the load balancing weights of the second set are different from respective load balancing weights of the first set. Additionally, deploying the second load balancing configuration includes re-configuring the nodes of the application environment to load balance the traffic among the clusters that provide the services in accordance with the second set of load balancing weights in place of the first set of load balancing weights.

In some arrangements, the clusters include a first microservice cluster and a second microservice cluster. Each of the first microservice cluster and the second microservice cluster provides a same microservice for the application. Additionally, a particular node initially load balances microservice requests among the first microservice cluster and the second microservice cluster in accordance with the first set of load balancing weights while the application environment metrics are sensed. Furthermore, re-configuring the nodes includes changing operation of the particular node to load balance microservice requests among the first microservice cluster and the second microservice cluster in accordance with the second set of load balancing weights.

In some arrangements, the clusters include a plurality of microservice clusters which forms a service mesh. The plurality of microservice clusters includes groups of clusters providing the same microservice.

In some arrangements, the clusters include a first service cluster and a second service cluster. Each of the first service cluster and the second service cluster performs a same application routine for the application. Additionally, a particular node initially load balances application routine requests among the first service cluster and the second service cluster in accordance with the first set of load balancing weights while the application environment metrics are sensed. Furthermore, re-configuring the nodes includes changing operation of the particular node to load balance application routine requests among the first service cluster and the second service cluster in accordance with the second set of load balancing weights.

In some arrangements, the application environment metrics includes application environment state information. Additionally, performing the self-adjustment operation includes entering the application environment state information into a policy engine constructed and arranged to generate load balancing configurations, the policy engine generating the second load balancing configuration based on the entered application environment state information.

In some arrangements, performing the self-adjustment operation further includes starting a sample timer that is configured to expire at a predefined sample time, the application environment state information being received into storage from the nodes after starting the sample timer and prior to expiration of sample timer at the predefined sample time. Additionally, the application environment state information is entered from the storage into the policy engine upon expiration of the sample timer at the predefined sample time.

In some arrangements, the nodes that provide a service can be traversed via multiple intermediate nodes from the load balancer to those nodes. Furthermore, the application environment metrics can include state information from all these intermediate nodes and their connecting paths.

In some arrangements, the policy engine includes an algorithmic policy model. Additionally, the sample of the application environment state information includes respective network latency samples, throughput samples, and application resource utilization samples from the nodes of the application environment. Furthermore, entering the sample of the application environment state information into the policy engine includes applying the respective network latency samples, throughput samples, and application resource utilization samples to the algorithmic policy model to create the second load balancing configuration.

In some arrangements, the method further includes:
(i) continuing to sense the application environment metrics to form a series of application environment state samples;
(ii) continuing to perform the self-adjustment operation periodically in response to operation of the sample timer to form a series of new load balancing configurations based on the series of application environment state samples; and
(iii) deploying the series of new load balancing configurations among the nodes to enable the nodes to load balance the traffic base on the series of new load balancing configurations.

In some arrangements, the method further includes computing a series of rewards based on the series of application environment state samples. The series of rewards identifies a series of application environment behavior changes over time.

In some arrangements, the series of new load balancing configurations includes a series of actions defining a series of load balancing adjustments made to the nodes of the application environment over time. Additionally, the method further includes forming a series of state-action-reward entries based on (i) the series of application environment state samples, (ii) the series of actions, and (iii) the series of rewards, and storing the series of state-action-reward entries in a state-action-reward repository.

In some arrangements, the method further includes starting an entry counter that is configured to count to a predefined entry count and, in response to the entry counter reaching the predefined entry count, performing an update operation that updates the policy engine based on the series of state-action-reward entries stored in the state-action-reward repository.

In some arrangements, the policy engine includes a deep learning model configured to output a set of actions to be taken for a given input state. Additionally, performing the update operation includes training the deep learning model using the series of state-action-reward entries stored in the state-action-reward repository.

In some arrangements, the nodes of the application environment include enforcement points that form a microservice mesh. Additionally, deploying the second load balancing configuration includes programming the enforcement points with respective load balancing policies that direct the enforcement points to load balance microservice requests in accordance with the respective load balancing policies.

In some arrangements, programming the enforcement points with the respective load balancing policies includes configuring a set of enforcement points to issue ingested microservice requests in accordance with round robin based load balancing.

In some arrangements, programming the enforcement points with the respective load balancing policies includes configuring a set of enforcement points to issue ingested microservice requests in accordance with a policy engine based load balancing.

In some arrangements, programming the enforcement points with the respective load balancing policies includes configuring a set of enforcement points to issue ingested microservice requests in accordance with reinforcement learning based load balancing.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing load balancing self-adjustment within an application environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing load balancing self-adjustment within an application environment. Along these lines, while nodes of the application environment load balance traffic among clusters that provide services for an application in accordance with an existing load balancing configuration, certain application environment metrics are sensed and used to electronically determine a new load balancing configuration to replace the existing load balancing configuration. For example, data from such metrics may be input into a policy engine that applies analytics to algorithmically generate the new load balancing configuration (e.g., different load balancing weights). The new load balancing configuration is then deployed among the nodes to replace the existing load balancing configuration to improve performance. Accordingly, such improved performance does not require an operator to provision the application environment with additional resources.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Figure 1:
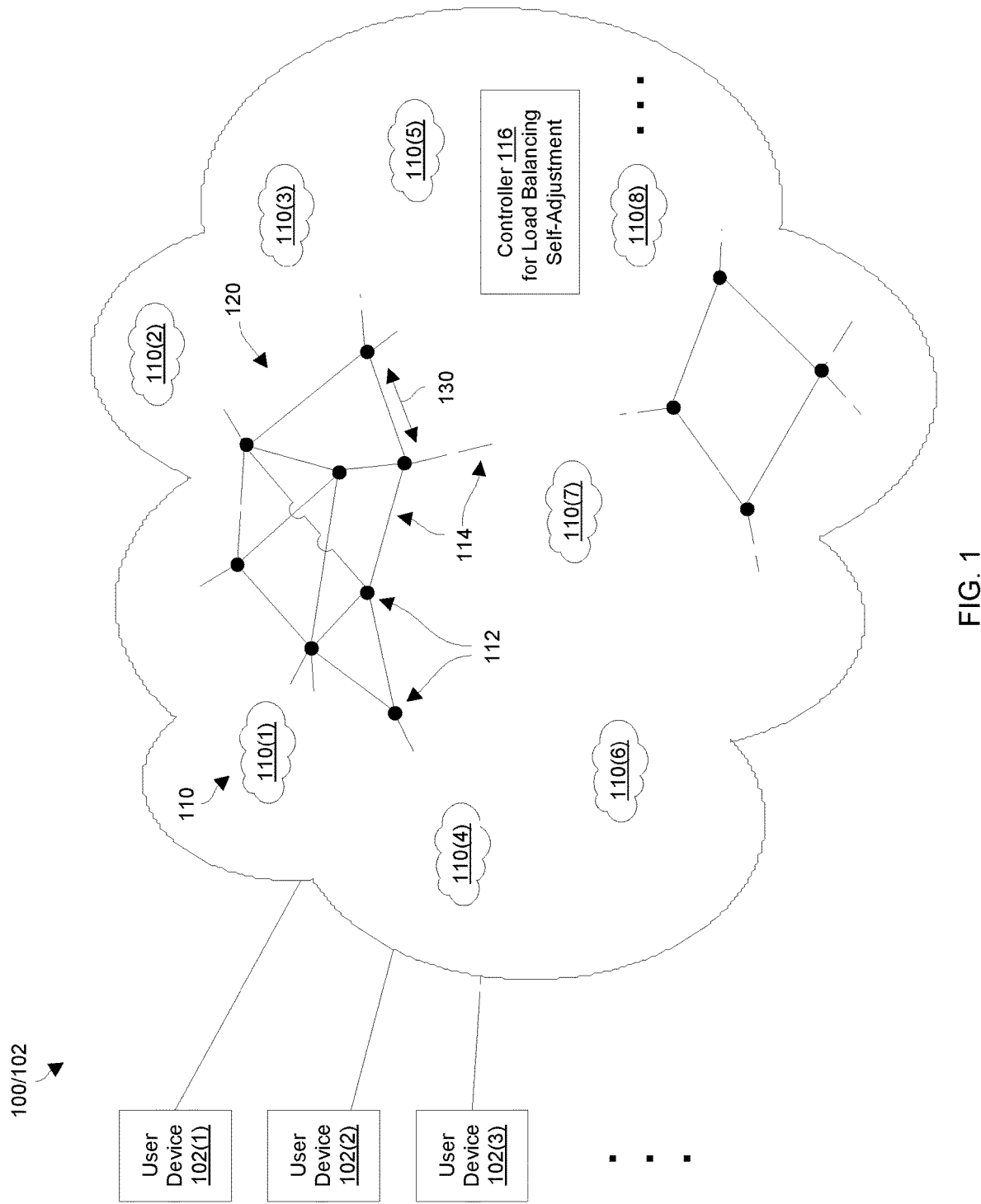
FIG. 1 is a block diagram of an application environment that provides load balancing self-adjustment in accordance with certain embodiments.

FIG. 1 is a block diagram of an application environment 100 that provides load balancing self-adjustment in accordance with certain embodiments. Such an application environment 100 is suitable for supporting operation of various applications 102 such as applications that use a microservices architecture, monolithic applications, combinations thereof, etc. Such applications 102 may use TCP, UDP and/or HTTP network protocols over the application environment 100 (e.g., an application network). Along these lines, the application environment 100 provides for improved traffic flow, lower latency, higher throughput, optimized connections, better balanced server loads, satisfying particular quality of service (QoS) objectives, combinations thereof, and so on.

As shown in FIG. 1, user devices 102(1), 102(2), 102(3), . . . (collectively, user devices 102) connect to the application environment 100 to utilize services provided by an application 102. Such user devices 102 may be any apparatus capable of performing useful work while utilizing services from the application 102. With the application environment 100 performing load balancing self-adjustment to improve performance, there is overall higher throughput and lower latency at the user devices 102 which in turn may improve the user experience.

The application environment 100 includes clusters 110, nodes 112, links 114, and a controller 116. At least a portion 120 of the application environment 100 is illustrated as a network fabric to indicate that the application environment 100 is capable of having a variety of different topologies including backbone, hub-and-spoke, loop, irregular, combinations thereof, and so on.

The clusters 110 provide different application services to support operation of one or more applications 102 utilized by the user devices 102. As will be explained in further detail shortly, such clusters 110 provide services (e.g., traditional application services, microservices, hybrid services, combinations thereof, etc.) may include multiple components that provide the same service.

It should be understood that a first cluster 110(1) providing a first application service may request a second application service from a second cluster 110(2). Likewise, the second cluster 110(2) may request a third application service from a third cluster 110(3), and so on. Moreover, although FIG. 1 depicts the application environment 100 as including clusters 110(1),110(2), 110(3), 110(4), 110(5), 110(6), 110(7), 110(8), . . . , it should be understood that the application environment 100 may include hundreds or even thousands of clusters 110 such as in the context of an application 102 that uses a microservices architecture.

The nodes 112 are constructed and arranged to facilitate and/or monitor operation of the application environment 110. To this end, the nodes 112 may operate as enforcement points that impose policies that influence application behavior and/or performance, and/or monitoring point to sense application environment metrics that identify how the application environment 110 is currently operating. Suitable metrics include network traffic conditions, numbers of connections from sources to destinations, latency, throughput, server loads, QoS metrics, as well as various other parameters.

The links 114 of the application environment 100 may include copper-based data communications devices and cabling, fiber optic devices and cabling, wireless devices, combinations thereof, and so on. Such links 114 connect the nodes 112 together to enable the nodes 112 to exchange various electronic signals 130 (e.g., see the double arrow 130) such as service requests from the user devices 102 and/or service requests from the clusters 110.

The controller 116 receives the application environment metrics from various nodes 112 and, based on the application environment metrics, generates new load balancing configurations for deployment among the nodes 112. Such load balancing configurations direct the nodes 112 as to how to load balance service requests among cluster components. Along these lines, the controller 116 may periodically update the load balancing scheme performed by the node 112 (e.g., from random to weighted round robin), replace initial load balancing weights with new load balancing weights, combinations thereof, and so on. Such self-adjusting operation may continue automatically and transparently to the user devices 102 to provide healthy application operation within the application environment 100.

It should be understood that the controller 116 may reside anywhere within the application environment 100. In some arrangements, the controller 116 runs on dedicated equipment (e.g., a datacenter, a dedicated platform, a virtualization platform, etc.). In other arrangements, the controller 116 runs on one or more of the earlier-mentioned components of the application environment 100 (e.g., one or more user devices 102, one or more nodes 112, combinations thereof, etc.). Other locations are suitable for use as well (e.g., in one or more clusters, in the cloud, etc.). Further details will now be provided with reference to FIG. 2.

Figure 2:
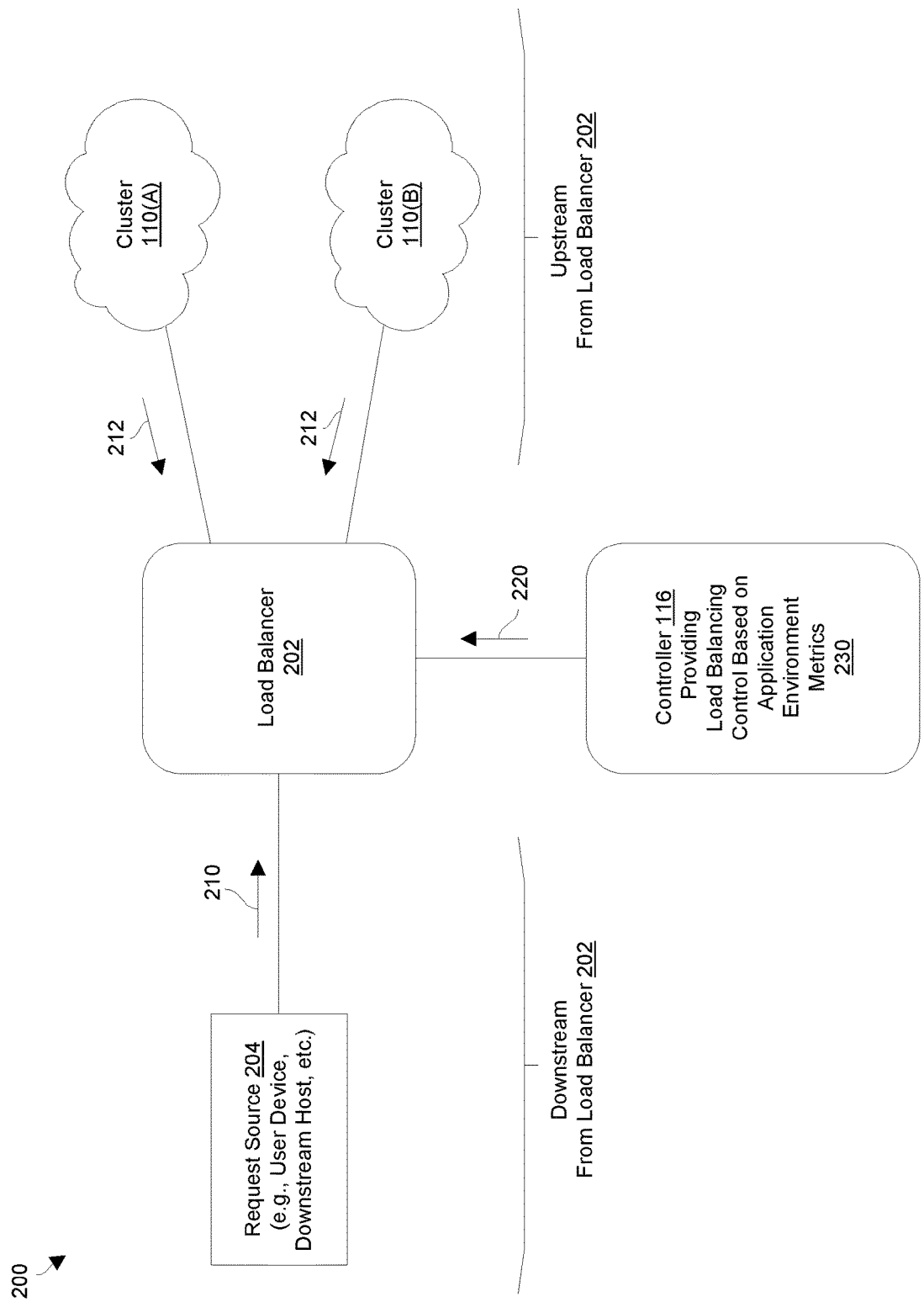
FIG. 2 is a block diagram of load balancing adjustment carried out at a load balancer in accordance with certain embodiments.

FIG. 2 shows a view 200 of load balancing adjustment details carried out by a load balancer 202 in accordance with certain embodiments. Such a load balancer 202 serve as one or more components of the application environment 100 (e.g., see the nodes 112 in FIG. 1).

The load balancer 202 is disposed between a request source 204 and multiple clusters 110(A), 110(B) (also see the clusters 110 in FIG. 1). For simplicity, only two clusters 110 are shown but it should be understood that the load balancer 202 is capable of load balancing traffic among any number of clusters 110 (e.g., three, four, five, etc.). A suitable request source 204 may be one of the user devices 102 or another component of the application environment 100 such as a service running on one of the clusters 110 (FIG. 1). It should be understood that the term "service" refers to a service in the traditional sense for a monolithic application or a microservice for an application that uses a microservices architecture.

The load balancer 202 processes service requests 210 from the request source 204 by forwarding the service requests 210 to the clusters 110 in accordance with a currently imposed load balancing scheme. Accordingly, the request source 204 is considered downstream and the clusters 110 are considered upstream. That is, the service requests 210 are passed from the request source 204 upstream to the clusters 110, and the services 212 in response to the requests 210 flow downstream from the clusters 110 back to the request source 204. Suitable load balancing schemes for the load balancer 202 include round robin, weighted round robin, random, choosing the least loaded cluster 110, and choosing the cluster 110 with the least traffic, among others.

As further shown in FIG. 2, the load balancer 202 receives control input 220 from the controller 116 (also see FIG. 1). As will be explained in further detail shortly, such control input 220 (e.g., commands, instructions, control messages, etc.) from the controller 116 is based on application environment metrics 230 received from the application environment 100. Accordingly and in contrast to static load balancing, the load balancer 202 is able to modify how the requests 210 are load balanced among the clusters 110 (i.e., change operation) in response to changes within the application environment 100 over time. Such modification may involve changing from one type of load balancing scheme to another (e.g., from round robin to random), replacing an existing set of load balancing weights used by the load balancer 202 with a new set of load balancing weights, combinations thereof, and so on.

For example, suppose that the load balancer 202 is currently applying weighted load balancing in accordance with a 50/50 load balancing configuration where 50% of the service requests 210 are sent to cluster 110(A) and the remaining 50% of the service requests 210 are sent to the cluster 110(B). This 50/50 load balancing configuration may initially work well, but become sub-optimal over time due to changes within the application environment 100 such as changes in user device behavior (e.g., increased service demand), changes within the network fabric (e.g., a failed link 114), changes in cluster capacity (e.g., a reduction in throughput at a particular cluster 110), other changes, combinations thereof, etc.

It should be understood that the controller 116 is able to detect such changes by analyzing the application environment metrics 230. As will be explained in further detail shortly and in accordance with certain embodiments, the controller 116 may input such metrics 230 into a policy engine or model which, in turn, outputs a new load balancing configuration. Moreover, in accordance with certain embodiments, the policy engine or model may be updated periodically (e.g., by a human administrator, algorithmically, via machine learning, via reinforced learning, combinations thereof, etc.) to provide optimized load balancing configurations over time.

In the above-described example, the controller 116 suppose that the policy engine generates a new load balancing configuration in response to recent application environment metrics 230. In particular, suppose that the new load balancing configuration is an 80/20 load balancing configuration where 80% of the service requests 210 should now be sent to cluster 110(A) and the remaining 20% of the service requests 210 should now be sent to the cluster 110(B).

Following generation of the new 80/20 load balancing configuration, the controller 116 deploys the new 80/20 load balancing configuration to the load balancer 202 via the control input 220. In response, the load balancer 202 replaces the prior 50/50 load balancing configuration with the new 80/20 load balancing configuration.

Such operation continues over time where the controller 116 receives new application environment metrics 230 from the application environment 100, and generates and deploys new load balancing configurations to the load balancer 202 in a self-adjusting manner. Further details will now be provided with reference to FIG. 3.

Figure 3:
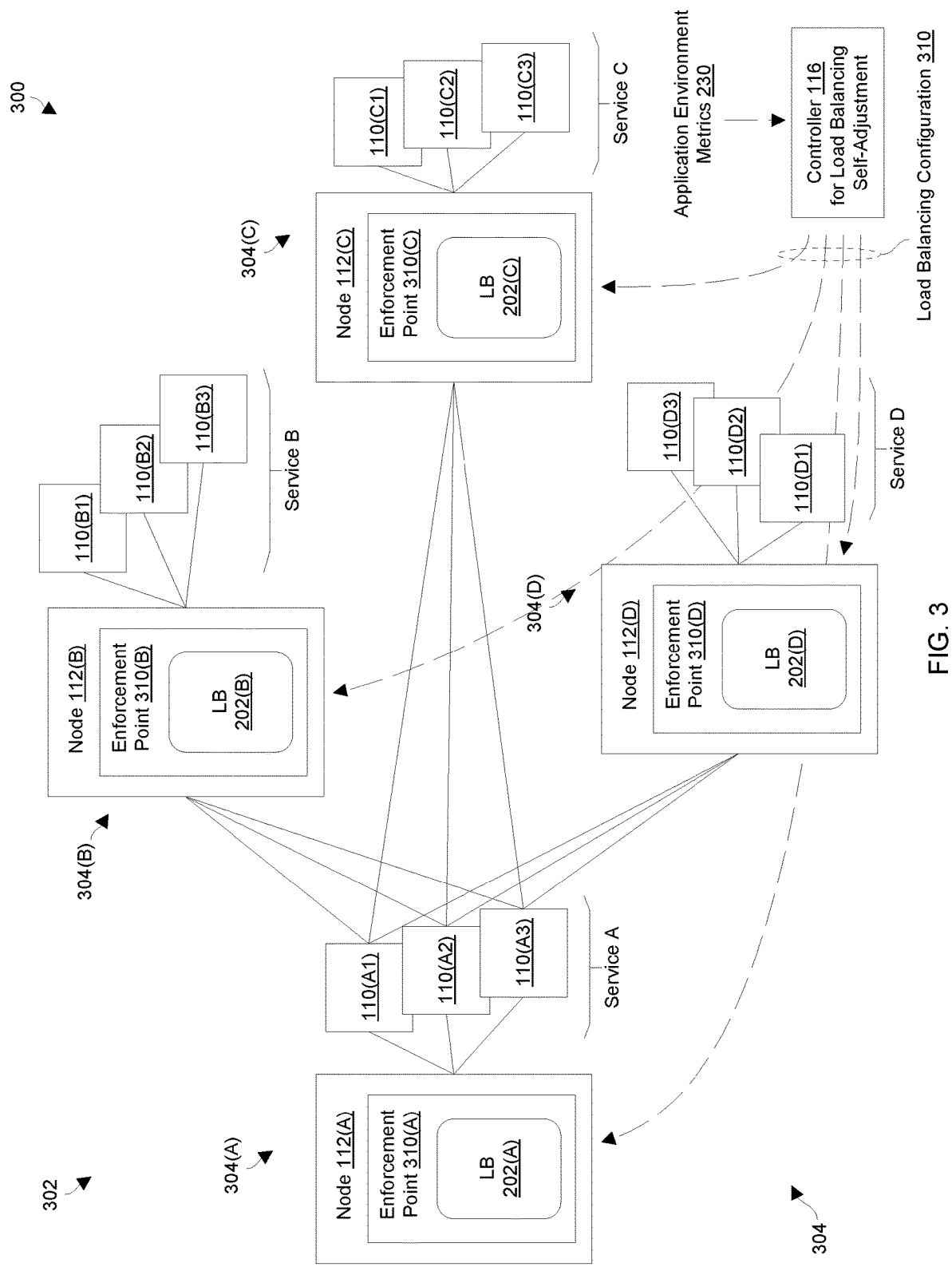
FIG. 3 is a block diagram of a portion of an application environment with multiple load balancers in accordance with certain embodiments.

FIG. 3 shows a view 300 of an example portion 302 of the application environment 100. The example portion 302 may for part of a larger setting such as the application environment 100 in FIG. 1.

As shown in FIG. 3, the example portion 302 includes multiple load balancing pairings 304. Such load balancing pairings 304 include load balancers 202 and clusters 110, where the load balancers 202 load balance service requests 210 to the clusters 110 in accordance with a series of updated load balancing configurations 310 from the controller 116. As explained earlier, such load balancing configurations 310 may be generated by the controller 116 based on application environment metrics 230 obtained from the application environment 100.

In accordance with this example, the load balancing pairing 304(A) includes a load balancer 202(A) and clusters 110(A1), 110(A2), 110(A3) that provide the same service (or microservice) A (also see the services 212 in FIG. 2). Similarly, the load balancing pairing 304(B) includes a load balancer 202(B) and clusters 110(B1), 110(B2), 110(B3) that provide the same service B. Likewise, the load balancing pairing 304(C) includes a load balancer 202(C) and clusters 110(C1), 110(C2), 110(C3) that provide the same service C. Furthermore, the load balancing pairing 304(D) includes a load balancer 202(D) and clusters 110(D1), 110(D2), 110(D3) that provide the same service D.

In some arrangements, the clusters 110(A1), 110(A2), 110(A3) may be a group of microservice clusters providing the first same microservice. Similarly, the clusters 110(B1), 110(B2), 110(B3) may be another group of microservice clusters providing the second same microservice, and so on.

It should be understood that each pairing 304 is shown as including a load balancer 202 that load balances service requests 210 to three clusters 110 by way of example only. However, each pairings 304 may include a different number of clusters (e.g., one, two, four, five, . . . ) and the load balancer 202 load balances service requests 210 to those different numbers of clusters in accordance with the series of updated load balancing configurations 310 from the controller 116.

In accordance with certain embodiments, one or more of the clusters 110 may be implemented as a server in the traditional sense. Such service clusters are well suited for supporting operation of monolithic applications operating within the application environment 100. For example, such a cluster 1100 may include one or more servers formed via one or more server applications running on dedicated hardware.

Additionally, in accordance with certain embodiments, one or more of the clusters 110 may be a microservices server. Such microservice clusters are well suited for supporting operation of applications using microservices architectures. For example, such a cluster 1100 may be formed via microservice code running in a data center or in a cloud infrastructure. Amazon Web Services offered by Amazon.com, Inc. of Seattle Wash., the Google Cloud Platform offered by Alphabet Inc. of Mountain View, Calif., and Microsoft Cloud Services offered by Microsoft Corporation of Redmond, Wash. are examples of suitable hosting platforms.

It should be understood that the load balancers 202 may reside within nodes 112 (also see FIG. 1). Along these lines, such a node 112 may serve as an enforcement point 310, and that the load balancer 202 forms part of the enforcement point 310 (i.e., to impose a current load balancing policy on service requests 210 (FIG. 2).

It should be understood that the example portion 302 illustrates a possible logical topology rather than a physical topology. Accordingly, the pathways between the various components may include a variety different communications media (e.g., copper, optical fiber, wireless, routers, switches, other type of data communications devices, combinations thereof, and so on), as well as span various distances (e.g., feet, campuses, cities, hundreds of miles, etc.).

It should be understood that the nodes 112 that provide a service can be traversed via multiple intermediate nodes 112 from the load balancer to those nodes 112. Furthermore, the application environment metrics can include state information from all these intermediate nodes 112 and their connecting links 114 (or paths). Such may be the situation when endpoints and services are connected to the load balancer via intermediate nodes 112 (e.g., multi-hop). Further details will now be provided with reference to FIGS. 4 through 8.

Figure 4:
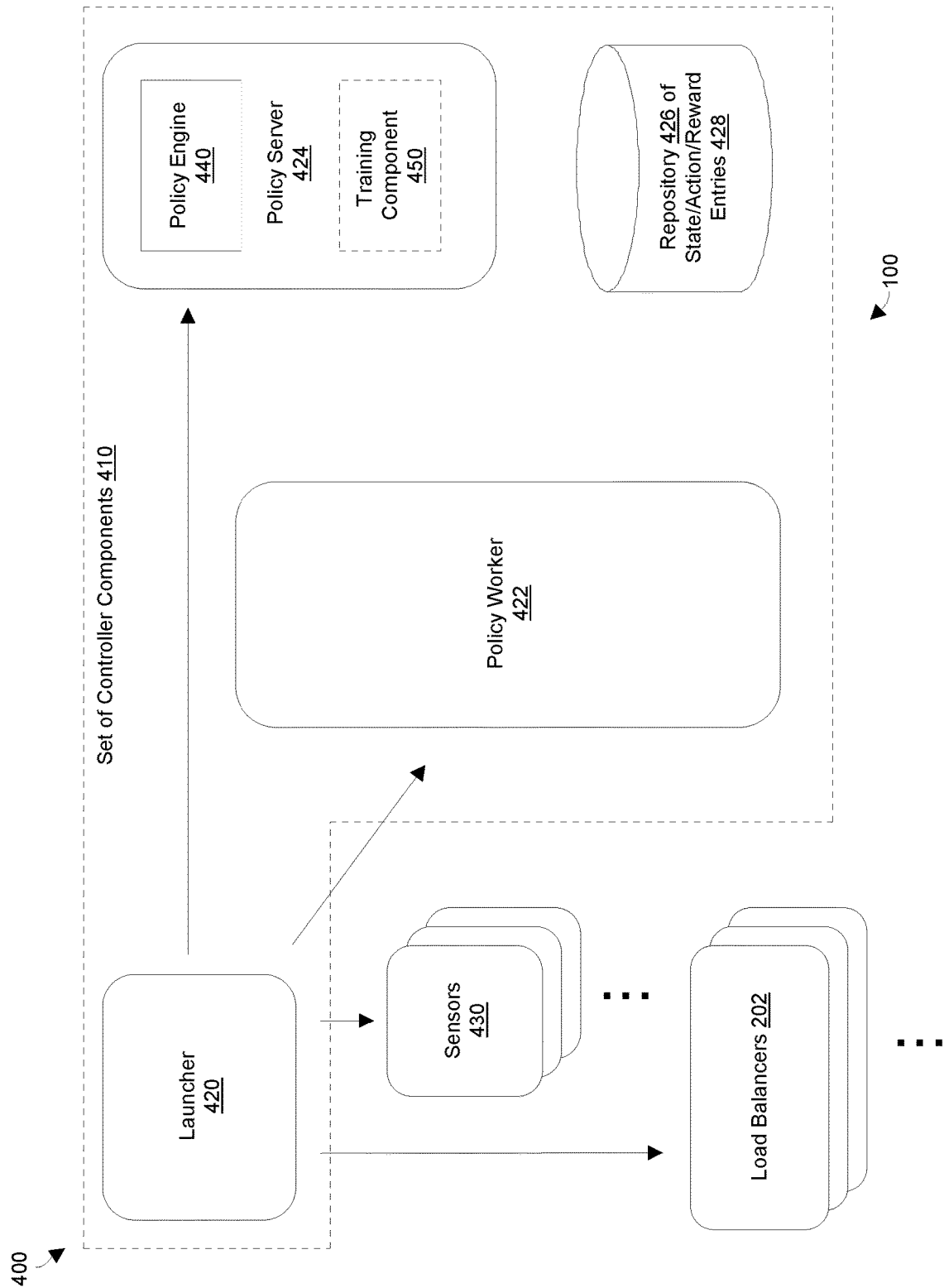
FIG. 4 is a block diagram of particular components are involved in load balancing self-adjustment in accordance with certain embodiments.
Figure 5:
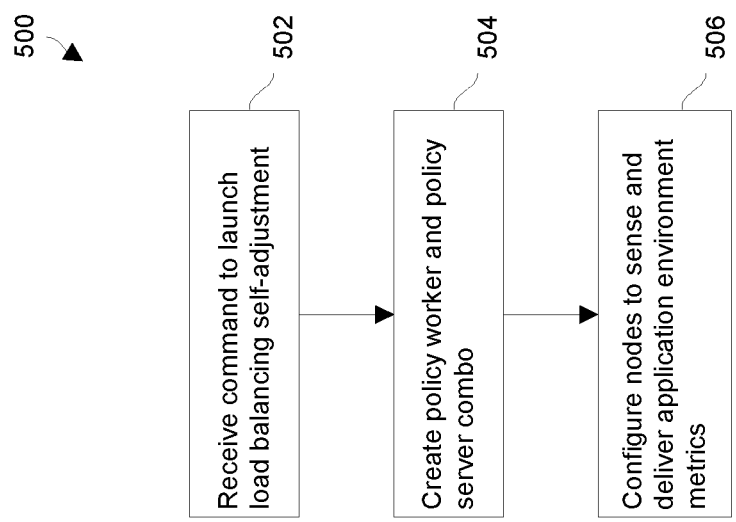
FIG. 5 is a flowchart of a procedure which is performed by a launcher in accordance with certain embodiments.
Figure 6:
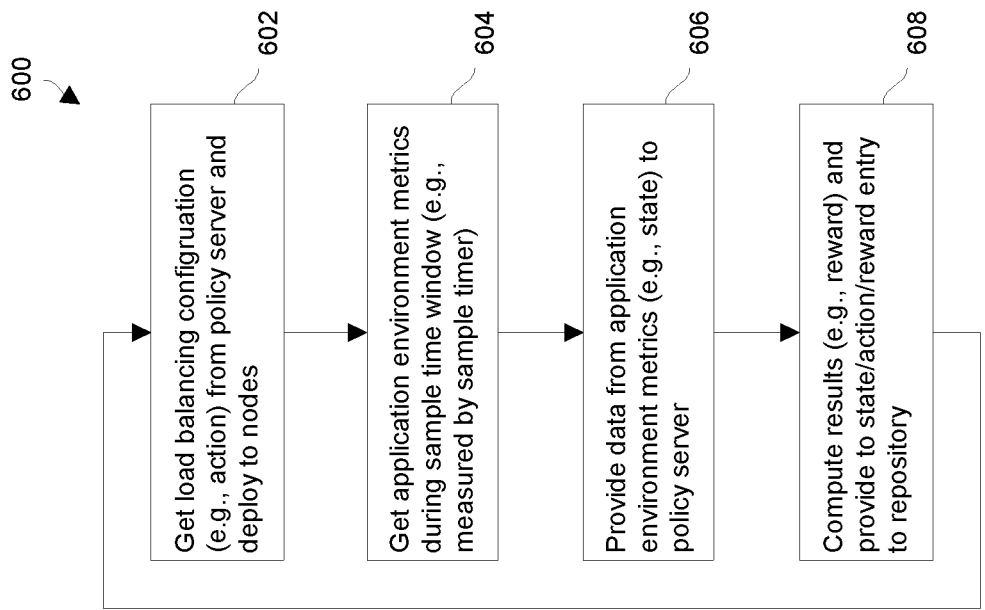
FIG. 6 is a flowchart of a procedure which is performed by a policy worker in accordance with certain embodiments.
Figure 7:
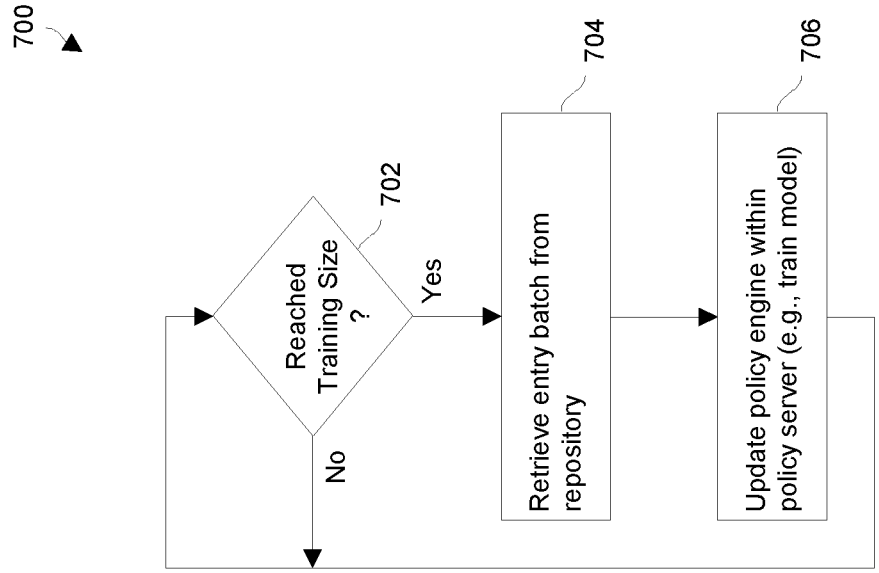
FIG. 7 is a flowchart of a procedure which is performed by a policy server in accordance with certain embodiments.
Figure 8:
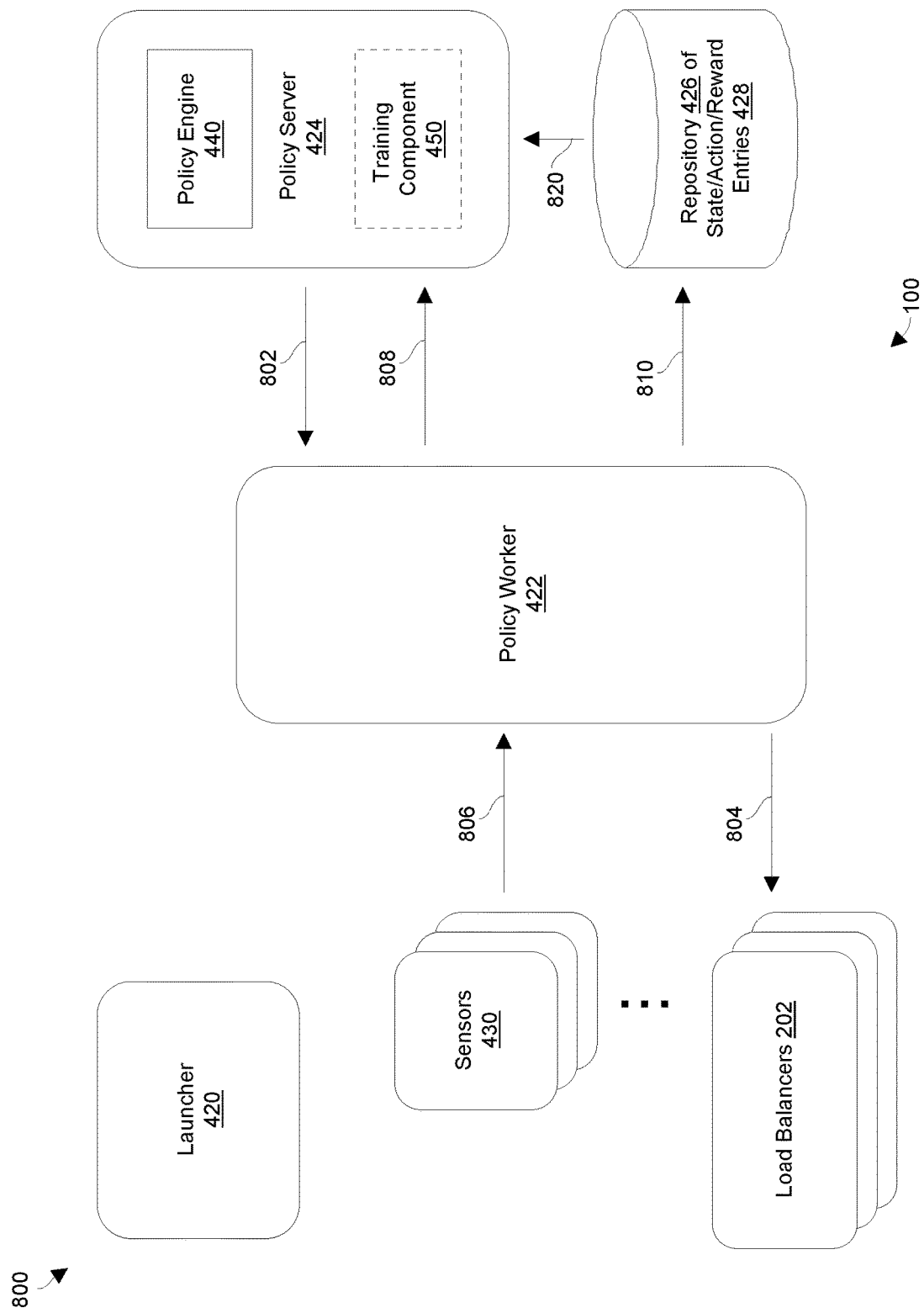
FIG. 8 is another block diagram of the particular components are involved in load balancing self-adjustment in accordance with certain embodiments.

FIGS. 4 through 8 illustrate details of how the controller 116 may be constructed in accordance with certain embodiments. FIG. 4 shows a view 400 in which particular components of an application environment 100 are put into operation. FIG. 5 shows a flowchart of a procedure 500 which is performed by a launcher of the application environment 100. FIG. 6 shows a flowchart of a procedure 600 which is performed by a policy worker of the application environment 100. FIG. 7 shows a flowchart of a procedure 700 which is performed by a policy server of the application environment 100. FIG. 8 shows a view 800 illustrating certain flows during operation of the application environment 100.

As best seen in the view 400 of FIG. 4 and in accordance with certain embodiments, various components of the application environment 100 are involved controlling load balancing self-adjustment. Along these lines, in contrast to the data plane where services 212 are delivered in response to service requests 210 (also see FIG. 2), particular components may reside in a control plane that controls load balancing behavior, and thus performance, of the data plane.

To this end, a set of components 410 of the controller 116 (also see FIGS. 1 and 2) includes a launcher 420, a policy worker 422, a policy server 424, and a repository 426 of state/action/reward entries 428. Such components 410 are shown to be contained within a dashed line to indicate that the form part of the controller 116, and to further illustrate that the components 410 do not necessarily need to reside at the same location. Rather, in some embodiments, one or more of the components 410 of the controller 116 may reside at a different locations (e.g., at a datacenter, remotely in different devices, distributed within the cloud, etc.).

The launcher 420 is constructed and arranged to create one or more of the other components 410 when the application environment 100 is ready for load balancing self-adjustment. Along these lines, the launcher 420 creates the policy worker 424 and the policy server 426 in response to a launch command.

The launcher 420 may further create the repository 426 or the repository 426 may already exist (e.g., as a template, as a database of previously stored sample data or preliminary/simulated data, etc.). As will be explained in further detail shortly, the repository 426 holds entries 428 (e.g., tuples or trajectories) of state details, action details, and reward details identifying particular aspects of the application environment 100 during particular times of operation.

Likewise, the launcher 420 may further create the sensors 430 and/or the load balancers 202 which reside within various nodes 112 of the application environment 100. Alternatively, the sensors 430 and/or load balancers 202 may already exist within the application environment 100 (e.g., previously deployed, available from third party service(s), combinations thereof, etc.).

It should be appreciated that certain off-the-shelf tools may facilitate deployment and/or operation of the sensors 430 and/or load balancers 202. Examples include service mesh and/or application deployment tools. Istio is suitable for implementing certain service mesh features. Prometheus is suitable for certain event monitoring and/or alerting features. Kubernetes is suitable for implementing certain deployment features.

The policy worker 422 is constructed and arranged to communicate with the various components in the view 400. In particular and as will be explained in further detail shortly, the policy worker 422 obtains application environment metrics 230 from the sensors 430 (also see FIGS. 2 and 3). Additionally, the policy worker 422 provides data relating to the application environment metrics 230 to the policy server 424 and the repository 426. Furthermore, the policy server 424 receives load balancing configurations from the policy server 424 and deploys the load balancing configurations to the load balancers 202.

The policy server 424 is constructed and arranged to apply data of application environment metrics 230 obtained from the policy worker 422, and generate new load balancing configurations for modifying operation of the load balancers 202 going forward. In some arrangements, the policy server 424 maintains a policy engine 440 which is equipped with a model that routinely receives the data of the application environment metrics 230 as state details (i.e., input), and provides new load balancing configurations as action details (i.e., output for the current input).

In accordance with certain embodiments, the policy server 424 further includes a training component 450, and the model of the policy engine 440 is periodically trained. As will be explained in further detail shortly, such training may involve updating the model with information from the repository 426. Suitable training methodologies include, among others, algorithmic implementations, supervised learning, unsupervised learning, reinforced learning, other machine learning techniques, combinations thereof, and so on.

The repository 426 is constructed and arranged to store state/action/reward entries 428. Such entries 428 may initially be from a template or preliminary. However, the policy worker 422 then continues to store further state/action/reward entries 428 within the repository 426 during operation of the application environment 100 (FIG. 1). Then, as just mentioned, such entries 428 may be used to periodically update the policy engine 440 of the policy server 424.

FIG. 5 shows a procedure 500 which is performed by the launcher 420 in accordance with certain embodiments. Such a procedure 500 prepares a application environment 100 (FIG. 1) to perform load balancing self-adjustment.

At 502, the launcher 420 receives a launch command. Such a command may be provided by an administrator as part of an initial setup routine.

At 504, the launcher 420 creates the policy worker 422 and the policy server 424. In some arrangements, the launcher 420 may create other components such as the repository 426 and/or the sensors 430 if such components are not already in place. It should be understood that various components 410 such as the policy worker 422, the policy server 424, and the repository 426 may be co-located within application environment 100 to minimize disruption in communications between. However, such components 410 may also be distributed within the application environment 100, e.g., at various locations within the cloud to take advantage of processing power, connectivity, scaling features, etc.

At 506, the launcher 420 configures the nodes 112 for sensing and delivery of particular application environment metrics 230. In accordance with certain embodiments, such application environment metrics 230 may include, among others, network traffic conditions, number of connections from source to destinations, latency, throughput, server loads, and the like.

FIG. 6 shows a flowchart of a procedure 600 which is performed by the policy worker 422 in accordance with certain embodiments. It should be understood that the procedure 600 may operate continuously to enable the application 102 running in the application environment 100 to self-adjust in an ongoing manner over time. FIG. 8 shows a view 800 of particular flows that occur and reference will be made to FIG. 8 when discussing the procedure 600 in further detail.

At 602, the policy worker 422 obtains a load balancing configuration from the policy server 424 (arrow 802 in FIG. 8) and deploys the load balancing configuration to load balancers 202 among the nodes 112 (arrow 804 in FIG. 8). Along these lines, the load balancing configuration may include sets of load balancing weights to be distributed among the various load balancers 202 (e.g., 20% on port A of load balancer #1, 40% on port B of load balancer #1, 40% on port C of load balancer #1, 50% 40% on port A of load balancer #2, 50% 40% on port B of load balancer #2, and so on). This load balancing configuration may be referred to as action details or simply an action.

Upon receipt of the sets the load balancing weights from the policy worker 422, the load balancers 202 modify their operation in accordance with the new load balancing weights. Accordingly, the behavior of the application 100 may improve based on the newly deployed load balancing configuration.

It should be understood that the load balancing configuration is described above as including load balancing weights by way of example. However, other load balancing changes may occur in place of or in addition to the weights. For example, one or more of the load balancers 202 may be directed to switch from performing random load balancing to weighted round robin load balancing, one or more other load balancers 202 may be directed to switch from weighted round robin load balancing to favor the least loaded cluster 110, and so on.

At 604, the policy worker 422 obtains application environment metrics 230 from the sensors 430 during a sample time window (arrow 806 in FIG. 8). Such a sample time window may be measured by a sample timer. A variety of amounts of times are suitable for the sample time window (e.g., 5 minutes, 15 minutes, 30 minutes, 1 hour, 2 hours, etc.).

At 606, the policy worker 422 provides data from the application environment metrics 230 to the policy server 424 (arrow 808 in FIG. 8). Along these lines, the policy work 422 may provide the raw application environment metrics 230 to the policy server 424. Alternatively, the policy work 422 may process the application environment metrics 230 (e.g., sum or tally certain metrics, compute or flag certain observations within the metrics, filter out or emphasize certain metrics relating to certain events, and so on). This instance of application environment metrics 230 provided to the policy server 424 may be referred to as state details or simply a state.

As mentioned earlier, in response to the data from the application environment metrics 230, the policy server 424 creates a new load balancing configuration. In some arrangements, the state is applied to a model (e.g., see the policy engine 440 in FIG. 8) which outputs a new action as the new load balancing configuration.

At 608, the policy worker 422 computes a set of results based on the action from 602 and the resulting state from 604. Such a set of results may be referred to as reward details or simply a reward. For example, a range of 0 to 1 may be used where 1 indicates a maximum improvement in the state in response to the action, and 0 indicates no improvement in the state in response to the action. The policy worker 422 then provides the action, the state, and the reward to the repository 426 (arrow 810 in FIG. 8) which is then stored as an entry 428 (i.e., a trajectory) in the repository 426.

At this point, 608 proceeds back to 602. Accordingly, the policy worker 422 repeats the procedure 600 for a new action from the policy server 424.

FIG. 7 shows a flowchart of a procedure 700 which is performed by the policy server 424 in accordance with certain embodiments. It should be understood that the procedure 700 may operate periodically to update a model of the policy engine 44 over time.

At 702, the policy server 424 determines whether the repository 426 has stores a predefined number of new entries 428 for a new training iteration. Such a determination may be made via a counter that counts newly received states from the policy worker 422. If the training size has not yet been reached, 702 waits (or loops) until the training size is reached. Once the training size is reach (i.e., the training component 450 detects that the repository 426 has stored a total number of new entries 428 equaling a predefined training size), 702 proceeds to 704 to begin a training session to train a model of the policy engine 440.

At 704, the policy server 424 begins the training session by accessing the repository 426. In particular, the training component 450 accesses the entries 428 (e.g., state/action/reward trajectories) from the repository 426 (arrow 820 in FIG. 8).

At 706, the policy server 424 updates the model. Such an update process may involve standard artificial intelligence teaching techniques. It should be appreciated that the particular combination of application environment metrics 230 (i.e., which parameters) that are sensed and adjusted may result in particular effectiveness in improving application performance.

In certain embodiments, the model includes a neural network and the training component 450 performs reinforcement learning. However, it should be understood that other training techniques are suitable for use such as making adjustments to alternative policy algorithms, utilizing other forms of artificial intelligence, and so on.

Once the training session has been completed, 706 proceeds back to 702.

Accordingly, the policy server 424 repeats the procedure 700 enabling the policy server 424 to self-adjust in an ongoing manner. Further details will now be provided with reference to FIG. 9.

Figure 9:
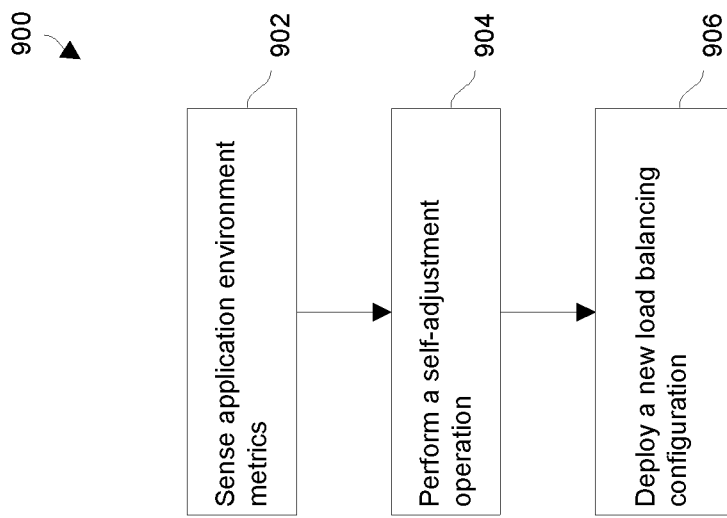
FIG. 9 is a flowchart of a procedure which is performed by a control plane in accordance with certain embodiments.

FIG. 9 is a flowchart of a procedure 900 which is performed by a control plane of an application environment to perform load balancing self-adjustment in accordance with certain embodiments.

At 902, while nodes of the application environment load balance traffic among clusters that provide services for an application in accordance with a first load balancing configuration, the control plane senses application environment metrics. Such metrics may include current network traffic conditions, numbers of connections from sources to destinations, latency, throughput, server loads, as well as various other parameters.

At 904, the control plane performing a self-adjustment operation that generates a second load balancing configuration based on the application environment metrics. The second load balancing configuration is different from the first load balancing configuration. Along these lines, the configurations may differ in terms of load balancing weights, load balancing schemes (e.g., random, round robin, etc.), which paths/links to use or not use, combinations thereof, and so on.

At 906, the control plane deploys the second load balancing configuration among the nodes to enable the nodes to load balance the traffic among the clusters that provide the services for the application in accordance with second load balancing configuration in place of the first load balancing configuration. Such operation enables the application environment to enjoy ongoing self-adjustment.

Figure 10:
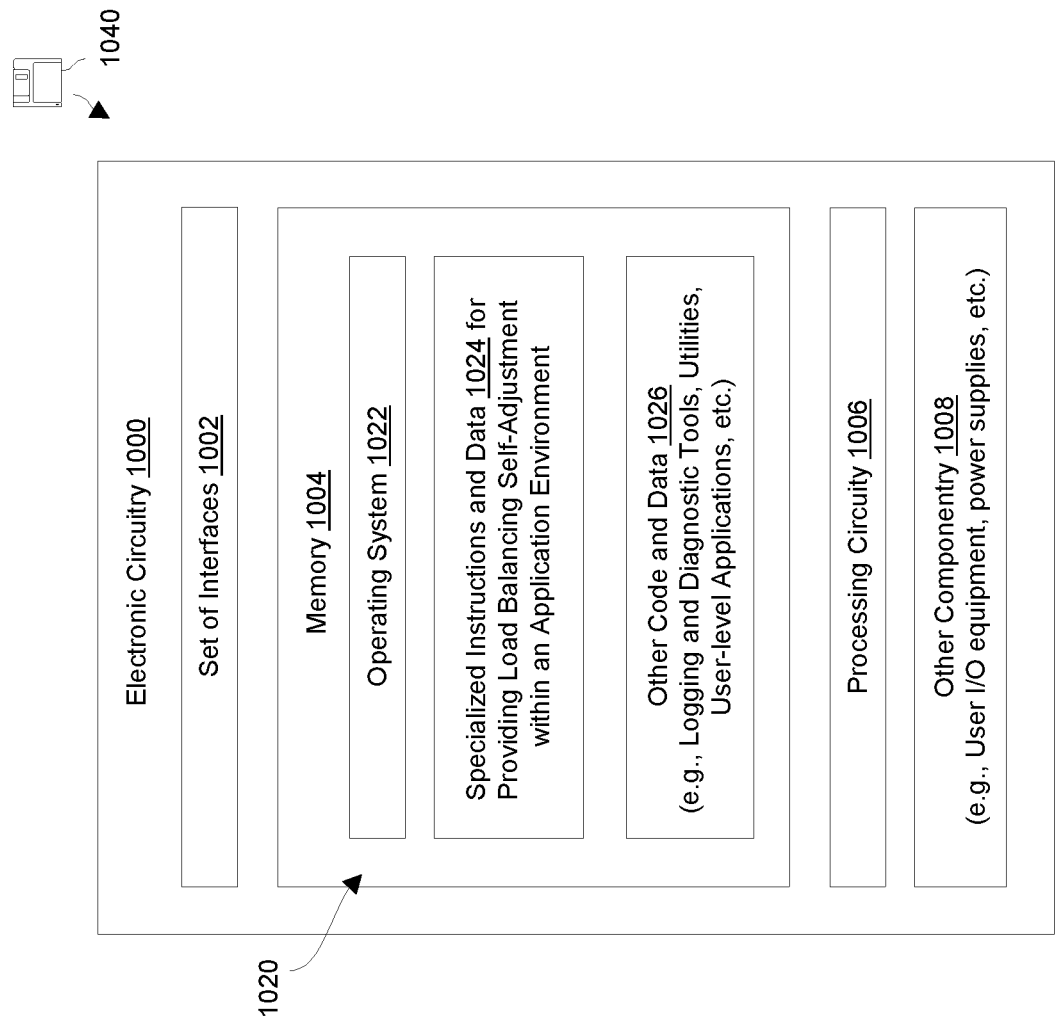
FIG. 10 is a block diagram of electronic circuitry which is suitable for use within the application environment of FIG. 1 in accordance with certain embodiments.

FIG. 10 shows electronic circuitry 1000 which is suitable for use within the application environment 100 in accordance with certain embodiments (also see FIG. 1).

The electronic circuitry 1000 includes a set of interfaces 1002, memory 1004, and processing circuitry 1006, and other circuitry (or componentry) 1008.

The set of interfaces 1002 is constructed and arranged to connect the electronic circuitry 1000 to the fabric of the application environment 100 (also see FIG. 1) to enable communications with other devices of the application environment 100 (e.g., the user devices 102, the clusters 110, the nodes 112, etc.). Such communications may be IP-based, SAN-based, cellular-based, cable based, fiber-optic based, wireless, combinations thereof, and so on. Accordingly, the set of interfaces 1002 may include one or more computerized interfaces. Accordingly, the set of interfaces 1002 enables the electronic circuitry 1000 to robustly and reliably communicate with other external apparatus.

The memory 1004 is intended to represent both volatile storage (e.g., DRAM, SRAM, etc.) and non-volatile storage (e.g., flash memory, magnetic memory, etc.). The memory 1004 stores a variety of software constructs 1020 including an operating system 1022, specialized instructions and data 1024, and other code and data 1026. The operating system 1022 refers to particular control code such as a kernel to manage computerized resources (e.g., processor cycles, memory space, etc.), drivers (e.g., an I/O stack), and so on. The specialized instructions and data 1024 refers to particular instructions for generating and deploying load balancing configurations for load balancing self-adjustment. In some arrangements, the specialized instructions and data 1024 is tightly integrated with or part of the operating system 1022 itself. The other code and data 1026 refers to applications and routines to provide additional operations and services (e.g., data logs, diagnostics, traces, etc.), user-level applications, administrative tools, utilities, and so on.

The processing circuitry 1006 is constructed and arranged to operate in accordance with the various software constructs 1020 stored in the memory 1004. As will be explained in further detail shortly, the processing circuitry 1006 executes the operating system 1022 and the specialized code 1024 to form specialized circuitry that robustly and reliably provides load balancing self-adjustment within an application environment 100 (FIG. 1). Such processing circuitry 1006 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In accordance with certain embodiments, the electronic circuitry 1000 is optimized for processing artificial intelligence/neural net related operations. Along these lines, the processing circuitry 1006 may include specialized co-processing and related neural net architectures, GPUs, and/or other related neural net/AI hardware for training and/or operating deep learning and related systems.

In the context of one or more processors executing software, a computer program product 1040 is capable of delivering all or portions of the software constructs 1020 to the electronic circuitry 1000. In particular, the computer program product 1040 has a non transitory (or non-volatile) computer readable medium which stores a set of instructions that controls one or more operations of the electronic circuitry 1000. Examples of suitable computer readable storage media include tangible articles of manufacture and apparatus which store instructions in a non-volatile manner such as DVD, CD ROM, flash memory, disk memory, tape memory, and the like.

The other componentry 1008 refers to other hardware of the electronic circuitry 1000. Along these lines, the electronic circuitry 1000 may include special user I/O equipment (e.g., a display, a keyboard, etc.), power supplies and battery backup units, auxiliary apparatuses, other specialized data storage componentry, etc.

It should be further understood that certain portions of the electronic circuitry 1000 may reside within one or more other components of the application environment such as a user device 102, a cluster 110, a node 112, etc). In accordance with certain embodiments, the electronic circuitry 1000 resides on multiple apparatus for high availability.

As described above, improved techniques involve providing load balancing self-adjustment within an application environment 100. That is, while nodes 112 of the application environment 100 load balance traffic among clusters 110 that provide services for an application 102 in accordance with an existing load balancing configuration, certain application environment metrics 230 are sensed and used to electronically determine a new load balancing configuration to replace the existing load balancing configuration. For example, data from such metrics 230 may be input into a policy engine 440 that applies analytics to smartly generate the new load balancing configuration (e.g., different load balancing weights). The new load balancing configuration is then deployed among the nodes 112 to replace the existing load balancing configuration. With the new load balancing configuration, the application environment 100 is able to provide more efficient and effective performance (e.g., improved traffic flow, lower latency, higher throughput, optimized connections, better balanced server loads, combinations thereof, etc.). As a result, such techniques are able to improve application performance without requiring an operator to provision the application environment with additional resources.

While various embodiments of the present disclosure have been particularly shown and described, it will be understood by those skilled in the art that various changes in form and details may be made therein without departing from the spirit and scope of the present disclosure as defined by the appended claims.

Along these lines and as explained above, it should be understood that the application environment 100 is well suited for both applications that use a microservices architecture as well as monolithic applications. Accordingly, the clusters 110 may take any scale (e.g., data centers, cloud platforms, individual server devices, etc.). Such modifications and enhancements are intended to belong to various embodiments of the disclosure.

It should be understood that certain embodiments are directed to systems and methods for reinforcement learning/machine learning based workflows for application group policies.

It should be appreciated that applications deployed at the cloud and edge aim to take advantage of the proximity of the deployment to the user, thus ensuring higher throughput and lower latency application performance which in turn improves user experience. The performance of the applications depends on the underlying network connecting the different components of the software. To fully take advantage of the edge and cloud based application deployments, the network parameters need to be fine tuned depending on different parameters like network traffic conditions, number of connections from source to destinations, latency, throughput, server loads and various other parameters.

As the size of the deployment grows in the number of servers, connections, microservices, etc., the total number of parameters to optimize grows at a large rate that makes it impossible to manually adjust them. This in turn causes degraded application performance resulting in poor end user experience. To mitigate this, operators usually deploy more network resources to improve performance thus increasing cost of deployment and operation. However, due to the dynamic nature of the underlying network and resource usages in the deployment, optimizations have to be done on an ongoing basis. The turnaround time required to analyze the problem and come up with different solutions that work may also be unacceptable in most cases.

The application environment with the different software components' lifecycle and operation, and the underlying network is modeled as a Reinforcement Learning system. A Reinforcement Learning and Machine Learning based system can learn the effect of the different parameter settings in the different states of an arbitrarily large application environment that can produce optimum performance for each of the application groups in real time. The operator can specify different policies for each of the application groups and the RL based system can learn to optimize the underlying network and application parameters to meet the policy objectives. The RL based system will operate alongside the application non-intrusively and will continually provide actions that are applied to the application environment such that the overall application group policy objectives are met.

The RL based system can be applied to applications deployed in a star, mesh and other arbitrary network topologies with single or multiple connections from clients (sources) and servers (destinations). The RL based system can be employed in an application deployed as containerized microservices or as execution environments in a virtual/bare-metal machine. The application network can be realized either as a network service mesh/slice or as direct network connections without an underlying mesh or a slice.

In some embodiments, the weights of a load balancer deployed in a network that connects different application software components are continuously modified by the RL system over time depending on the network parameters like latency and throughput, to ensure that application performance objectives are met.

The applications may be using TCP, UDP or HTTP network protocols over the application network.

An application network is a dynamic environment with changing traffic conditions, network latencies, network throughput, resource consumption within each of the application components.

Operators of the network and applications rely on analytics provided by the network operators and their own software to understand where optimizations can be made. In most cases, application networks are started in their default configurations and over time operators of the network and developers of the application software analyze metrics to propose improvements or fixes to problems. Also, in most cases, both network and application resources are over-provisioned to begin with and rely on cloud and edge providers to provide them insight into the different metrics or to provide hooks to dynamically or manually adjust resources in the deployment.

As the application components grow in number and the number of connectivity between their different components increase, the number of parameters in the network and application components can grow at a very fast rate. Adjusting the large number of parameters manually or as determined by offline statistical or analytical methods takes time and the effectiveness of the predicted parameters decreases with passing time. Furthermore, the exercise has to be repeated over the lifetime of the applications. This approach is sub-optimal, error prone, time consuming and not flexible to accommodate multiple and varying performance objectives.

In accordance with certain embodiments, the Reinforcement Learning based system used for application group policies includes:

A component that provides a set of metrics that are available from the environment in real time that can be used to describe the state of the environment in which the application is operating. These metrics are ingested by the RL system and are input to the algorithm that is learning to predict optimal settings or actions. The RL system uses network latency and throughput, application resource utilizations like CPU and memory, current time and other metrics.

An enforcement point(s) in the application network that modifies the behavior of the environment. In one aspect of the environment, this enforcement point is a Load Balancer software that connects different components like sources and destinations in the application. The output of the RL system is a set of actions that are applied to the enforcement point. An RL policy algorithm that is trained on the metrics generated by the environment and learns over time to map the state of the environment to the optimum action like the set of weights that are applied to the load balancer.

The operation of the RL system is as follows:

The enforcement point(s) and the topology of the application network are determined from the deployment and provided to the RL system.

The RL policy algorithm which incorporates a deep learning model that has many parameters (weights) that are adjusted during training. The deep learning model outputs an action to be taken (set of weights for the load balancer) for a given input state.

The state input and its corresponding output from the RL policy model is computed every step duration.

The RL algorithm is trained over time by providing the feedback of its actions as rewards. A trajectory of (state, action, reward) for each step of the algorithm is saved for training at a later time. The duration of each step and training is a configurable parameter.

The reward system of the algorithm is a function of the overall application policy objective as input by the operator of the network.

The algorithm optimizes the RL policy by adjusting its model parameters depending on the (state, action, reward) sequences. For a positive reward, the model parameters are adjusted by taking the gradient of the loss function of the algorithm to the input state and adding the gradient to the model parameters. For a negative reward, the model parameters are adjusted in the negative direction. In this way, over time, the RL system is able to better predict and adjust the parameters of the environment to meet the overall objective.

The RL system is able to scale to handle any application network of arbitrary number of connected services.

It will learn over time to optimize the network and application performance to meet the overall objective without the intervention of any operator.

The RL system will continuously operate and adapt to any changes in the environment, topology and other parameters. It can handle application networks implemented over several network protocols including TCP, HTTP and UDP.

The RL system can autonomously operate and learn the different parameters that need to be adjusted to optimize the performance of the application network. It can handle any changes in application deployment and adapt accordingly.

There are many components in the RL system. The component responsible to read the metrics from the application environment can be implemented in different ways.

The communication mechanism from the RL system to the components responsible to program the actions could be implemented in different ways.

The RL system can be a standalone application or could be part of the application environment without changing the end result.

The duration of the step in the algorithm could be modified to better suit the application environment dynamics.

The topology of the application network can be reduced to a different representation of topology in the algorithm but the RL system can still be employed in the same way.

APPENDIX

It should be further appreciated that classic load balancers (LBs) have static configurations for weights. Classic LBs are used to assign traffic to endpoints based on these weights according to the current load, i.e., number of originating requests. In the event of upstream hosts or the connecting links not performing well, these weights will have to be manually adjusted. The weights are usually assigned by using very simple rules or heuristics based on history of the connections and upstream host performance.

However, in accordance with certain embodiments, an improved load balancing scheme provides an automated way of adjusting the weights of the load balancer. Along these lines, such an improved scheme provides for learning and adapting to changing network conditions, upstream host conditions or application level feedback.

Network Traffic Behavior

By using machine learning algorithms, the effects of many parameters in the network may be combined to predict the weights that will optimize the objective in which the operator is interested. Further, these load balancers can be arranged in a hierarchical manner and the weights can be adjusted to changing path conditions in a multi-hop network of arbitrary topology. As the network complexity increases, adjusting these weights in the load balancer by manual means is impractical, especially given the fact that not all communication between sources and destinations have the same data, bandwidth and compute requirements over time. The improved RL-based load balancer can handle adjusting the weights of the load balancers in a multi-hop network as well.

A/B Testing

During A/B testing of an ecommerce website, the requests from users may be divided into 50% to each version of the website. Over time, if users directed to the new website convert more than 50% of the users are unnecessarily sent to the older website causing loss in revenue. In a RL based setting, the weights of the load balancer can be slowly changed autonomously to accommodate more users to the new website based on the conversion rate. Although this doesn't highlight changing the load balancer based on the network conditions, this highlights how load balancing can help with meeting an overall reward objective using an application level feedback.

This document describes the simulations that compare the performance of a classic load balancer to the improved RL based load balancer.

Requirements

1. A comparison of classic load balancing algorithms versus RL loading balancing algorithms shall be made. The following classic load balancing algorithms will be studied:
   a. Round Robin
   b. Weighted Round Robin
   c. Random
2. The following network topologies shall be assumed:
   a. A single source (downstream) and two destinations (upstream) with load balancing
3. The following objective shall be used as performance criteria:
   a. Number of requests meeting QoS
   b. Utilization—total throughput is maximized across all the links
4. The following QoS objectives shall be supported:
   a. Throughput
      i. This is measured as the average data rate, in Mbps, that is transmitted from the source to the destination via the links from the load balancer to the upstream cluster(s).
   b. Latency
      i. This is measured as the average delay, in /ms or /s, for the data to travel from the source to the destination as measured by each of the links from the load balancer to the upstream cluster(s).
   c. Both
5. The following scenarios shall be simulated for network conditions:
   a. Two path topology:
      i. Path 1 and Path 2 alternate between good and bad over time
         1. Different patterns (alternate, random)
      ii. Path 1 goes completely bad
   b. Hierarchical topology Static Load Balancing Policies Weighted Round Robin This is a simple policy in which each available upstream host is selected in round robin order. If weights are assigned to endpoints in a locality, then a weighted round robin schedule is used, where higher weighted endpoints will appear more often in the rotation to achieve the effective weighting.

WRR works on single requests if they are within a certain duration and the load balancer will partition the requests across hosts based on the weights.

Weighted Least Request

The least request load balancer uses different algorithms depending on whether hosts have the same or different weights.

all weights equal: An O(1) algorithm which selects N random available hosts as specified in the configuration (2 by default) and picks the host which has the fewest active requests. This is also known as P2C (power of two choices). The P2C load balancer has the property that a host with the highest number of active requests in the cluster will never receive new requests. It will be allowed to drain until it is less than or equal to all of the other hosts.

all weights not equal: If two or more hosts in the cluster have different load balancing weights, the load balancer shifts into a mode where it uses a weighted round robin schedule in which weights are dynamically adjusted based on the host's request load at the time of selection. In this case the weights are calculated at the time a host is picked using the following formula:

$$\text{weight} = \text{load\_balancing\_weight} / (\text{active\_requests} + 1)^{\text{active\_request\_bias}}.$$

active_request_bias can be configured via runtime and defaults to 1.0. It must be greater than or equal to 0.0.

The larger the active request bias is, the more aggressively active requests will lower the effective weight.

If active_request_bias is set to 0.0, the least request load balancer behaves like the weighted round robin load balancer and ignores the active request count at the time of picking.

For example, if active_request_bias is 1.0, a host with weight 2 and an active request count of 4 will have an effective weight of $2/(4+1)^1=0.4$. This algorithm provides good balance at steady state but may not adapt to load imbalance as quickly. Additionally, unlike P2C, a host will never truly drain, though it will receive fewer requests over time.

WLR requires a number of active requests. This will require changes to our simulation and RL policy algorithm.

Random

The random load balancer selects a random available host. The random load balancer generally performs better than round robin if no health checking policy is configured. Random selection avoids bias towards the host in the set that comes after a failed host.

Reinforcement Learning Based Load Balancing Reinforcement Learning agents learn to take actions in an environment that will maximize the notion of a cumulative reward. The environment is defined as a Markov decision process (MDP) with:

A set of environment or agent states, S
A set of actions the agent can take in the environment, A
A policy Π(a/s), that provides a mapping of actions to states at a certain time t
A reward function, R, that provides an immediate reward when the state transitions from s to s'.

Unlike Supervised learning, RL does not require explicitly labeled datasets and can even take sub-optimal actions in the short term that maximizes a long term objective in the environment. RL lends itself to learning autonomously in a changing environment. The state, action and reward are taken over discrete time steps.

In an application network, the load balancer setting is formulated as a reinforcement learning problem as follows:
The actions are the weights that the load balancer applies to the upstream clusters it is connected to.
The state of the environment is represented by the metrics that are collected over a time duration for each of the links connecting the upstream.
The reward is a function of the observation derived from the above metrics that shows how far the algorithm is are from reaching the overall objective.

Simulation Methodology

Assume a two path network topology as shown above with a client and a load balancer in the middle splitting traffic to the upstream clusters according to the weights programmed. With a properly functioning load balancer, the traffic to the two upstream nodes are split proportional to the weights W1 and W2,
Simulate a number of sessions from the client over a time interval and the load balancer diverts these sessions to the two upstreams according to the ratio W1/W2,
Use the latency of the upstream links from the LB to upstream hosts as the metrics.
Define latency thresholds as HD and non-HD, i.e., QoS of the link is HD if latency less than LHD, else QoS is non-HD
The overall objective of the network is to maximize the number of sessions that can be set up over the links that support HD latency, NHD, while the path behavior of the two upstreams are continuously varying.

In the case of fixed weight round robin load balancer with weights W1 and W2 and total number of sessions, N, set up over time, each path is assigned N*W1/(W1+W2) and N*W2/(W1+W2) sessions respectively. The following conclusions can be made analytically.

Given a condition that only one of the paths is good enough to support HD latency over a time interval, the maximum number of sessions that support HD latency, NHD, is equal to the sessions assigned to the good path during that time interval.

If only path 1 support LHD, then, NHD<=N*W1/(W1+W2). If only path 2 supports LHD, then NHD<=N*W2/(W1+W2). The average NHD will be between N*W1/(W1+W2) and N*W2/(W1+W2). If both paths support LHD, then NEED N.

In the case of reinforcement learning based load balancers, once the algorithm has learnt the optimal actions to take over time, the load balancer weights will be programmed to maximize the overall performance. The RL-based LB will assign the higher weight to the good path and a lower weight to the not so good path.

If WH is the optimal higher weight used by the RL-based LB, then the number of sessions that support HD latency will be approximately always equal to N*WH/(WH+WL) and the average will also be closer to the same value. If both paths support LHD, then NHD~=N, similar to the fixed WRR LB.

Results
Expected Results
Simulation Results
Above: fixed weight vs RL LB
Above: RL vs random LB weights
Above: RL vs random LB weights smoothened to show average behavior
The summary graph of the study is shown above.
There are 4 Load balancers being tested:
1. LB with 50-50 weight setting (Round Robin Case)—"glowing-terrain" line
2. LB with 80-20 weight setting (Weighted RR)—"giddy-cloud" line
3. LB with 20-80 weight setting (Weighted RR)—"volcanic-hill" line
4. RL-Trained adaptive Load Balancer—"fanciful-bird" line
5. Random weights setting where [50,50], [80,20], [20,80] are set at random It describes the Total_Ratio on the Y-axis (defined as total measured HD-satisfied data points count/total data points per step (action taken every step)) versus path behavior changes as per "phases" on the X-axis.

The graph shows a full episode of 15 Steps. 15 steps are subdivided into 3 phases:
1. phase 1: Path1—set to HD behavior and Path2 to HD behavior (step 1-5)
2. phase 2: Path1—set to SD behavior and Path2 to HD behavior (step 6-10)
3. phase 3: Path1—set to HD behavior and Path2 to SD behavior (step 11-15)

CONCLUSIONS

Non RL based LBs work well only when path behavior is favorable to them, i.e., WRR with weights 80/20 works well only during phase 1 (path 1-HD, path 2-HD) or phase 3 (path 1-HD, path 2-SD) and suffer when a non-favorable condition occurs i.e., WRR 80-20 suffers during phase 2 (path 1-SD, path2-HD)
RL based learnt policy adaptively changes weights as per measured state. RL based LB works well throughout the phase changes.
RL based policy LB, suffers at boundary of the phase change. i.e., at step 6, end of phase 1, the measured state is from the previous phase. The action taken at the edge hence will get bad reward, but RL recovers the very next step.
RL based LB works better in changing path behaviors on average than a fixed set

What is claimed is:
1. A method of performing load balancing self-adjustment within an application environment, the method comprising:
while nodes of the application environment load balance traffic among clusters that provide services for an application in accordance with a first load balancing configuration, sensing application environment metrics, the application environment metrics including network conditions and latency and cluster metrics from the clusters including throughput, resource utilization and cluster capacities of the clusters;

performing a self-adjustment operation that generates a second load balancing configuration based on the application environment metrics, the second load balancing configuration being different from the first load balancing configuration; and deploying the second load balancing configuration among the nodes to enable the nodes to load balance the traffic among the clusters that provide the services for the application in accordance with the second load balancing configuration in place of the first load balancing configuration, wherein the application environment metrics includes application environment state information, the application environment state information including network traffic conditions and latency, throughput, CPU and memory utilization, and current time, and wherein performing the self-adjustment operation includes entering the application environment state information into a policy engine constructed and arranged to generate load balancing configurations, the policy engine generating the second load balancing configuration based on the entered application environment state information, and wherein performing the self-adjustment operation further includes:

calculating a sample timer value based on one or more metrics which indicate an amount of time required to compute the application environment state information across a set of load balancing sessions of the clusters;

starting a sample timer that is configured to expire after an amount of time corresponding to the sample timer value, the application environment state information being received into storage from the clusters after starting the sample timer and prior to expiration of the sample timer; and entering the application environment state information from the storage into the policy engine upon expiration of the sample timer.

2. The method of claim 1 wherein the first load balancing configuration includes a first set of load balancing weights; and
wherein sensing the application environment metrics includes:
obtaining the application environment metrics while the nodes of the application environment load balance the traffic among the clusters that provide the services in accordance with the first set of load balancing weights.

3. The method of claim 2 wherein the second load balancing configuration includes a second set of load balancing weights, at least some of the load balancing weights of the second set being different from respective load balancing weights of the first set; and
wherein deploying the second load balancing configuration includes:
re-configuring the nodes of the application environment to load balance the traffic among the clusters that provide the services in accordance with the second set of load balancing weights in place of the first set of load balancing weights.

4. The method of claim 3 wherein the clusters include a first microservice cluster and a second microservice cluster, each of the first microservice cluster and the second microservice cluster providing a same microservice for the application;
wherein a particular node initially load balances microservice requests among the first microservice cluster and the second microservice cluster in accordance with the first set of load balancing weights while the application environment metrics are sensed; and
wherein re-configuring the nodes includes:
changing operation of the particular node to load balance microservice requests among the first microservice cluster and the second microservice cluster in accordance with the second set of load balancing weights.

5. The method of claim 3 wherein the clusters include a plurality of microservice clusters which forms a service mesh, the plurality of microservice clusters including groups of clusters providing the same microservice.

6. The method of claim 3 wherein the clusters include a first service cluster and a second service cluster, each of the first service cluster and the second service cluster performing a same application routine for the application;
wherein a particular node initially load balances application routine requests among the first service cluster and the second service cluster in accordance with the first set of load balancing weights while the application environment metrics are sensed; and
wherein re-configuring the nodes includes:
changing operation of the particular node to load balance application routine requests among the first service cluster and the second service cluster in accordance with the second set of load balancing weights.

7. The method of claim 1, wherein the policy engine includes an algorithmic policy model;
wherein the sample of the application environment state information includes:
respective network traffic conditions, network latency samples, throughput samples, and application resource utilization samples from the clusters of the application environment; and
wherein entering the sample of the application environment state information into the policy engine includes:
applying the respective network traffic conditions, network latency samples, throughput samples, application resource utilization samples, and current time to the algorithmic policy model to create the second load balancing configuration.

8. The method of claim 1, further comprising:
continuing to sense the application environment metrics from the clusters to form a series of application environment state samples;
continuing to perform the self-adjustment operation periodically in response to operation of the sample timer to form a series of new load balancing configurations based on the series of application environment state samples; and
deploying the series of new load balancing configurations among the nodes to enable the nodes to load balance the traffic among the clusters based on the series of new load balancing configurations.

9. The method of claim 8, further comprising:
computing a series of rewards based on the series of application environment state samples, the series of rewards identifying a series of application environment behavior changes over time.

10. The method of claim 9 wherein the series of new load balancing configurations includes a series of actions defining a series of load balancing adjustments made to the nodes of the application environment over time; and
   wherein the method further comprises:
      forming a series of state-action-reward entries based on (i) the series of application environment state samples, (ii) the series of actions, and (iii) the series of rewards, and
      storing the series of state-action-reward entries in a state-action-reward repository.

11. The method of claim 10, further comprising:
   starting an entry counter that is configured to count to a predefined entry count, and
   in response to the entry counter reaching the predefined entry count, performing an update operation that updates the policy engine based on the series of state-action-reward entries stored in the state-action-reward repository.

12. The method of claim 11 wherein the policy engine includes a deep learning model configured to output a set of actions to be taken for a given input state; and
   wherein performing the update operation includes:
      training the deep learning model using the series of state-action-reward entries stored in the state-action-reward repository.

13. The method of claim 1 wherein the nodes of the application environment include enforcement points that form a microservice mesh; and
   wherein deploying the second load balancing configuration includes:
      programming the enforcement points with respective load balancing policies that direct the enforcement points to load balance microservice requests in accordance with the respective load balancing policies.

14. The method of claim 13 wherein programming the enforcement points with the respective load balancing policies includes:
   configuring a set of enforcement points to issue ingested microservice requests in accordance with round robin based load balancing.

15. The method of claim 13 wherein programming the enforcement points with the respective load balancing policies includes:
   configuring a set of enforcement points to issue ingested microservice requests in accordance with reinforcement learning based load balancing.

16. Electronic circuitry, comprising:
   memory; and
   control circuitry coupled to the memory, the memory storing instructions which, when carried out by the control circuitry, cause the control circuitry to perform a method of:
      while nodes of an application environment load balance traffic among clusters that provide services for an application in accordance with a first load balancing configuration, sensing application environment metrics, the application environment metrics including network conditions and latency and cluster metrics from the clusters including throughput, resource utilization and cluster capacities of the clusters,
      performing a self-adjustment operation that generates a second load balancing configuration based on the application environment metrics, the second load balancing configuration being different from the first load balancing configuration, and
      deploying the second load balancing configuration among the nodes to enable the nodes to load balance the traffic among the clusters that provide the services for the application in accordance with the second load balancing configuration in place of the first load balancing configuration,
   wherein the application environment metrics includes application environment state information, the application environment state information including network traffic conditions and latency, throughput, CPU and memory utilization, and current time, and wherein performing the self-adjustment operation includes entering the application environment state information into a policy engine constructed and arranged to generate load balancing configurations, the policy engine generating the second load balancing configuration based on the entered application environment state information,
   and wherein performing the self-adjustment operation further includes:
      calculating a sample timer value based on one or more metrics which indicate an amount of time required to compute the application environment state information across a set of load balancing sessions of the clusters;
      starting a sample timer that is configured to expire after an amount of time corresponding to the sample timer value, the application environment state information being received into storage from the clusters after starting the sample timer and prior to expiration of the sample timer; and
      entering the application environment state information from the storage into the policy engine upon expiration of the sample timer.

17. A computer program product having a non-transitory computer readable medium which stores a set of instructions to perform load balancing self-adjustment within an application environment; the set of instructions, when carried out by computerized circuitry, causing the computerized circuitry to perform a method of:
   while nodes of the application environment load balance traffic among clusters that provide services for an application in accordance with a first load balancing configuration, sensing application environment metrics, the application environment metrics including network conditions and latency and cluster metrics from the clusters including throughput, resource utilization and cluster capacities of the clusters;
   performing a self-adjustment operation that generates a second load balancing configuration based on the application environment metrics, the second load balancing configuration being different from the first load balancing configuration; and
   deploying the second load balancing configuration among the nodes to enable the nodes to load balance the traffic among the clusters that provide the services for the application in accordance with the second load balancing configuration in place of the first load balancing configuration,
   wherein the application environment metrics includes application environment state information, the application environment state information including network traffic conditions and latency, throughput, CPU and memory utilization, and current time, and wherein performing the self-adjustment operation includes entering the application environment state information into a policy engine constructed and arranged to generate load balancing configurations, the policy engine generating the second load balancing configuration based on the entered application environment state information, and wherein performing the self-adjustment operation further includes:

calculating a sample timer value based on one or more metrics which indicate an amount of time required to compute the application environment state information across a set of load balancing sessions of the clusters;

starting a sample timer that is configured to expire after an amount of time corresponding to the sample timer value, the application environment state information being received into storage from the clusters after starting the sample timer and prior to expiration of the sample timer; and entering the application environment state information from the storage into the policy engine upon expiration of the sample timer.

* * * * *